(12) United States Patent
Price et al.

(10) Patent No.: US 8,976,254 B2
(45) Date of Patent: Mar. 10, 2015

(54) TEMPORAL ALIASING REDUCTION AND CODING OF UPSAMPLED VIDEO

(71) Applicant: Apple Inc., Cupertino, CA (US)

(72) Inventors: Douglas Scott Price, San Jose, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 13/691,163

(22) Filed: Nov. 30, 2012

(65) Prior Publication Data

US 2013/0329064 A1 Dec. 12, 2013

Related U.S. Application Data

(60) Provisional application No. 61/657,628, filed on Jun. 8, 2012.

(51) Int. Cl.
| | |
|---|---|
| H04N 5/228 | (2006.01) |
| H04N 7/01 | (2006.01) |
| H04N 19/132 | (2014.01) |
| H04N 19/136 | (2014.01) |
| H04N 19/587 | (2014.01) |
| H04N 5/77 | (2006.01) |
| H04N 19/80 | (2014.01) |

(52) U.S. Cl.
CPC ........... *H04N 7/0102* (2013.01); *H04N 7/0135* (2013.01); *H04N 7/0127* (2013.01); *H04N 7/0137* (2013.01); *H04N 19/132* (2014.01); *H04N 19/136* (2014.01); *H04N 19/80* (2014.01); *H04N 19/587* (2014.01); *H04N 5/772* (2013.01)
USPC .............. 348/208.13; 348/208.1; 348/208.21; 348/222.1

(58) Field of Classification Search
CPC ........... H04N 7/34; H04N 7/36; H04N 7/461; H04N 7/465; H04N 7/46
USPC ........ 348/208.1, 208.2, 208.13, 220.1, 412.1, 348/411.1; 382/238; 375/240.12, 240.16
See application file for complete search history.

(56) References Cited

U.S. PATENT DOCUMENTS

| | | | |
|---|---|---|---|
| 8,036,494 B2 | 10/2011 | Chen | |
| 8,159,579 B2 | 4/2012 | Jannard et al. | |
| 8,660,175 B2 * | 2/2014 | Dane et al. ............... | 375/240.02 |
| 2007/0242748 A1 * | 10/2007 | Mahadevan et al. ...... | 375/240.14 |
| 2010/0079605 A1 * | 4/2010 | Wang et al. ................ | 348/208.4 |
| 2010/0141783 A1 * | 6/2010 | Sakaguchi et al. ......... | 348/222.1 |
| 2010/0272184 A1 * | 10/2010 | Fishbain et al. ......... | 375/240.16 |
| 2011/0037894 A1 | 2/2011 | Sbaiz | |
| 2011/0176043 A1 | 7/2011 | Baker et al. | |
| 2012/0195376 A1 * | 8/2012 | Wu et al. ................... | 375/240.12 |

* cited by examiner

*Primary Examiner* — Nhan T Tran
(74) *Attorney, Agent, or Firm* — Kenyon & Kenyon LLP

(57) ABSTRACT

Embodiments of the invention provide techniques for upsampling a video sequence for coding. According to the method, an estimate of camera motion may be obtained from motion sensor data. Video data may be analyzed to detect motion within frames output from a camera that is not induced by the camera motion. When non-camera motion falls within a predetermined operational limit, video upsampling processes may be engaged. In another embodiment, video upsampling may be performed by twice estimating image content for a hypothetical new a frame using two different sources as inputs. A determination may be made whether the two estimates of the frame match each other sufficiently well. If so, the two estimates may be merged to yield a final estimated frame and the new frame may be integrated into a stream of video data.

24 Claims, 3 Drawing Sheets

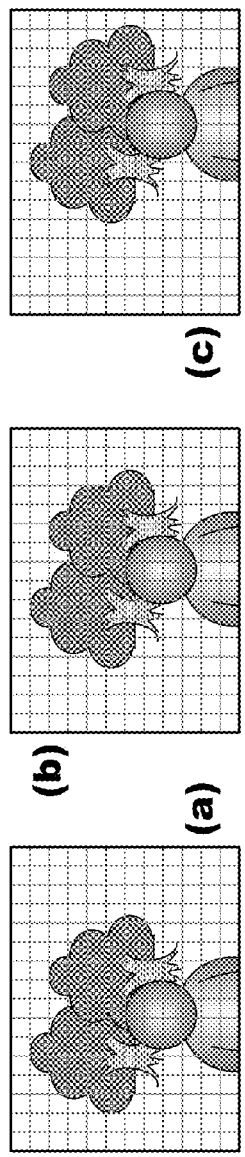
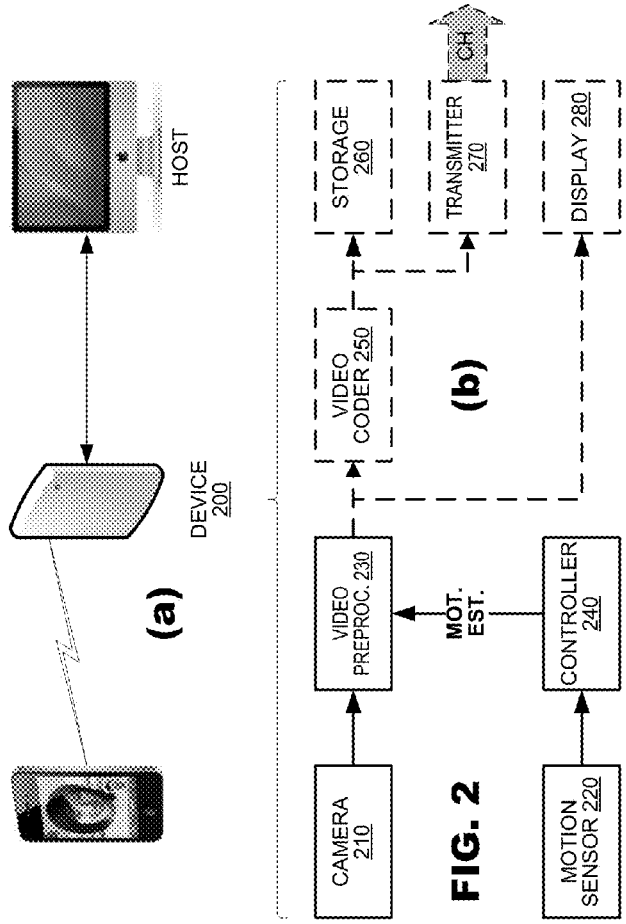
FIG. 1
FIG. 2

300

400

500

TEMPORAL ALIASING REDUCTION AND CODING OF UPSAMPLED VIDEO

CROSS-REFERENCE TO RELATED APPLICATION

This application claims priority to U.S. Provisional Patent Application Ser. No. 61/657,628, entitled "Temporal Aliasing Reduction and Coding of Upsampled Video" filed on Jun. 8, 2012, the content of which is incorporated herein in its entirety.

BACKGROUND

Video coding/decoding systems often exploit spatial and/or temporal redundancy in video data to compress video data for transport over a bandwidth-limited channel. Frames of a source video sequence often are parsed into pixel blocks, spatial arrays of image content, and coded predictively with reference to other coded video data. For example, to exploit temporal redundancy in video data, a video coder may search among data of locally stored reconstructed reference frames to identify prediction matches. When a match is found, the encoder may identify a portion of the reference frame that serves as a prediction match and, depending on the quality of the match, may code data representing differences between the source pixel block and the matching pixel block from the reference frame. To exploit spatial redundancy in video data, a video coder may predict content of a source pixel block using neighboring pixel blocks as prediction sources. Thereafter, the encoder may code data representing differences between the source pixel block and the prediction reference within the current frame. A video encoder, therefore, outputs a data stream of coded video data that has a smaller data rate than the source video sequence.

Notwithstanding the efficiencies achieved by such operations, video coding/decoding systems have their drawbacks. Typically, the coding/decoding process introduces data loss and, therefore, data recovered by a decoder typically replicates the source video sequence but involves loss of information. Thus, image quality can suffer. Additionally, the coding/decoding process can introduce coding artifacts based on the pixel block-based coding operations; when reconstructed pixel blocks are assembled into frames, content discontinuities can arise at seams between pixel blocks, which may be noticeable to viewers. Further, high variance regions of image data, particularly during slow panning operations, can exhibit shimmering artifacts when decoded and rendered, which may be induced by incorrect estimations of motion and/or prediction.

FIG. 1 illustrates a scenario in which a shimmering effect might arise. FIG. 1 represents three exemplary frames of a video data captured during a panning operation. A panning operation may occur when a camera operator sweeps a camera through a predetermined path at consistent speed. Thus, image content within each frame may drift in a direction opposite to the direction of the camera pan unless motion of objects within the camera's field of view contradicts the panning operation.

FIG. 1 illustrates three objects within the field of view—a person and trees in the background. The background trees may represent high variance image content because leaves, branches, etc. contribute to relatively complex content. A shimmering artifact may arise when points of registration among the trees—reflections of light from leaves or shadows from between leaves—do not register with each other as the image content drifts within the field of view. The shimmering artifacts can be exacerbated as a result of not correcting rolling shutter artifacts.

BRIEF DESCRIPTION OF THE DRAWINGS

FIG. 1 illustrates three exemplary frames of video data captured during a panning operation in which a shimmering effect might arise.

FIG. 2 is a simplified block diagram of a video recording and upsampling device according to an embodiment of the present invention.

DETAILED DESCRIPTION

Figure 3:
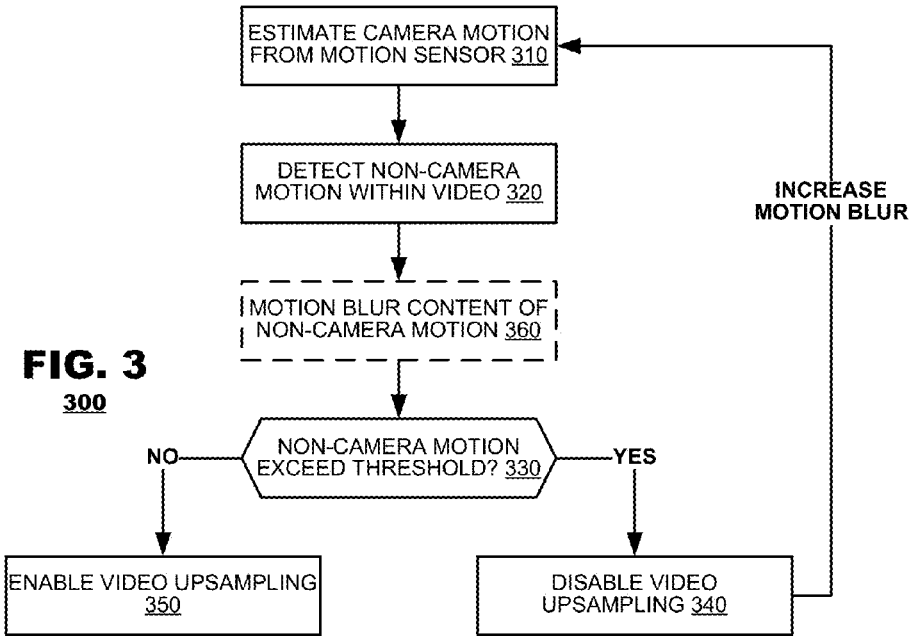
FIG. 3 is a diagram illustrating a method to detect non-camera motion in video data and determine whether to upsample the video data according to an embodiment of the present invention.

Embodiments of the invention provide techniques for upsampling a video sequence for coding. According to the method, an estimate of camera motion may be obtained from motion sensor data. Video data may be analyzed to detect motion within frames output from a camera that is not induced by the camera motion. When non-camera motion falls within a predetermined operational limit, video upsampling processes may be engaged.

In another embodiment, video upsampling may be performed by twice estimating image content for a hypothetical new frame $F_{t+1/2}$ at time $t+\frac{1}{2}$ using two different sources as inputs: 1) frame data $F_t$ captured by the camera at time t and a motion estimate derived from motion sensor data associated with the camera at time t, and 2) frame data $F_{t+1}$ captured by the camera at time t+1 and a motion estimate derived from motion sensor data associated with the camera at time t+1. A determination may be made whether the two estimates of frame $F_{t+1/2}$ match each other sufficiently well. If so, the two estimates may be merged to yield a final estimated frame $F_{t+1/2}$ at time $t+\frac{1}{2}$ and the new frame may be integrated into a stream of video data.

FIG. 2 is a simplified block diagram of a device 200, according to an embodiment of the present invention. The device 200 may include a camera 210 that captures image information and generates a sequence of video data therefrom, a motion sensor 220 that detects orientation of the device 200 in free space and generates data representing such orientation, a video preprocessor 230 that applies processing operations to the video sequence output by the camera 210 in response to motion estimation data, and a controller 240 that interprets data from the motion sensor 220 and generates motion estimation data to the video preprocessor 230.

The components described above may be integrated into a larger system within the device 200 which may include a video coder 250 that applies data compression operations on video data output by the preprocessor 230, a storage device 260 to store coded video data output by the video coder 250 for later use (e.g., rendering and/or display), a transmitter 270 to transmit from the device 200 coded video data output by the video coder 250, for example, by wireless or wireline communication links, and/or a display unit 280 to display video data output by the preprocessor 230.

During operation, the camera 210 may output video data to the preprocessor 230. Moreover, as the camera 210 generates video, the motion sensor 220 may generate data representing movements of the device 200 in free space. The controller 240 may interpret the sensor data and generate motion estimates to the video preprocessor 230. The motion sensor data typically is provided at a sample rate that exceeds the frame rate of the camera 210. For example, motion sensor data may provide samples at 200,000 samples per second (200 KHz) whereas the camera 210 may generate frame data at 24 or 30 frames per second. The controller 240 may generate motion estimates to the video preprocessor for each frame output by the camera or, alternatively, for each row of video data output by the camera. Based on the motion estimates, the video preprocessor 230 may apply rolling shutter correction, upsample the frame rate of the video sequence, or otherwise condition the video data for display and/or coding.

When video coding is to be applied, the video coder 250 may perform coding operations to the video that exploit spatial and temporal redundancies in the video sequence. The video coder 250 may output a data stream of coded video data that has a reduced bitrate as compared to the data stream output from the video preprocessor 230. The coded video data may be stored within the device 200 or transmitted from the device 200 as application needs dictate.

FIG. 3 is a diagram illustrating a method 300 according to an embodiment of the invention. The method 300 may begin by estimating camera motion from the motion sensor data (box 310). Thereafter, the method 300 may detect motion within the video sequence output by the camera that is not induced by the camera ("non-camera motion") (box 320). The method 300 may determine whether the non-camera motion exceeds a predetermined threshold (box 330). If so, the method 300 may inhibit video upsampling processes (box 340) but, if not, the method 300 may engage video upsampling processes (box 350).

In an embodiment, operations of the method 300 may be performed by the controller 240 and preprocessor 230 of FIG. 2. The controller 240 may estimate camera motion from motion sensor data and output motion estimates to the video preprocessor 230. The video preprocessor 230 may detect the non-camera motion within the input video sequence. For example, given a frame $F_t$ at time t and an estimate of motion between times t and t+1, the video preprocessor 230 may derive a frame $F'_{t+1}$ that likely would occur at time t+1 in the absence of non-camera motion. The video preprocessor 230 may compare $F_{t+1}$ a frame captured by the camera 210 at time t+1 to the derived frame $F'_{t+1}$ to estimate non-camera motion. In another embodiment, the preprocessor 230 may perform operations, such as object detection, on input video data to track motion of the detected objects within image content from frame to frame and to compare frame-by-frame trajectories of such objects to trajectories that would be estimated solely from the motion sensor data.

In an embodiment, the method 300 may be performed over a sequence of video data of predetermined duration to determine whether to engage video upsampling or not (boxes 340, 350). That is, the method 300 may perform the operations of boxes 310-330 over frames of a predetermined period of time (say, 10 seconds) and may engage video upsampling only after video content indicates non-camera motion has been constrained within limits of the threshold for the entirety of the predetermined period. Adding such latency to the method 300 may improve quality of the output data in borderline use cases where, otherwise, the method 300 might toggle quickly between enabling and disabling video upsampling, which likely would be perceived as adding jitter to the video sequence when it ultimately is rendered.

Optionally, the method 300 of FIG. 3 may include operations to apply motion blur filtering to image content within frames that are detected to have non-camera motion (box 360). In such embodiments, the method 300 also may include feedback operations to increase strength of motion blur filtering when non-camera motion is deemed to exceed governing thresholds of operation up to a predetermine strength limit. Increasing the motion blur filtering may increase the likelihood that non-camera motion of a filtered frame will reside within governing thresholds.

In another embodiment, the method 300 may include operations to detect and spatially filter regions of high variance data within a frame (operation not shown). In such embodiments, the method 300 also may include feedback operations to increase strength of spatial filtering when non-camera motion is deemed to exceed governing thresholds of operation up to a predetermine strength limit. Increasing the spatial filtering may increase the likelihood that non-camera motion of a filtered frame will reside within governing thresholds.

Figure 4:
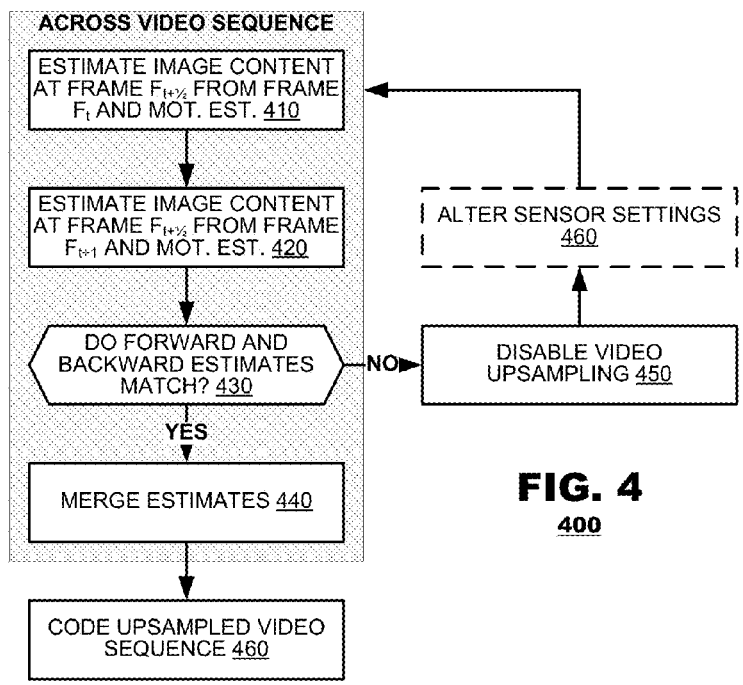
FIG. 4 is a diagram illustrating a method of upsampling video data according to an embodiment of the present invention.

FIG. 4 illustrates a method 400 for upsampling video data, according to an embodiment of the present invention. The method 400 may begin by estimating image content for a hypothetical new frame $F_{t+1/2}$ at time t+½ using frame data $F_t$ captured by the camera at time t and motion estimates obtained from the motion sensor data (box 410). Informally, the estimation at box 410 may be considered to be an interpolation of frame $F_{t+1/2}$ working "forward" in time from frame $F_t$. The method 400 also may estimate image content for the new frame $F_{t+1/2}$ using frame data $F_{t+1}$ captured by the camera at time t+1 and motion estimates obtained from the motion sensor data (box 420). The estimation at box 420 may be considered an interpolation of frame $F_{t+1/2}$ working "backward" in time from frame $F_{t+1}$. At box 430, the method 400 may determine whether the forward estimate of frame $F_{t+1/2}$ and the backward estimate of frame $F_{t+1/2}$ match each other sufficiently well. If so, the method 400 may merge the forward and backward estimates to yield a final estimated frame $F_{t+1/2}$ at time t+½ (box 440). If the forward and backward estimates do not match, the method may disable video upsampling 450.

The operation of boxes 410-440, assuming forward and backward estimates do generate appropriate matches, may yield an output video sequence having an upsampled frame rate. At box 460, the method may code the upsampled video sequence for transmission and/or storage.

In an embodiment, operations of boxes 410-430 may be performed on a sequence of video data of predetermined duration to determine whether to engage video upsampling or not (boxes 440, 450). That is, the method 400 may perform the operations of boxes 410-430 over frames of a period of time (say, 10 seconds) and may engage video upsampling only after the forward and backward estimate match each other for the entirety of the predetermined period. Adding such latency to the method 400 may improve quality of the output data in borderline use cases where, otherwise, the method 400 might toggle quickly between enabling and disabling video upsampling, which likely would be perceived as adding jitter to the video sequence when it ultimately is rendered.

Merger of video data may involve averaging content of the pair of interpolated frames and, optionally, filtering of the frame obtained therefrom. For example, merged frame data may be subject to edge detection and filtering to preserve sharp edges in the output frame data.

In one embodiment, when forward and backward interpolation do not achieve interpolated frames that match each other sufficiently well, the method 400 may alter camera settings to increase the likelihood that future frames will generate data that can be used with interpolation. For example, image sensor settings may be altered to maintain an output frame at a constant value but to increase integration times of pixels within the sensor and to lower gain of the sensor. Doing so likely will increase motion blur of content within the source video data and increase the likelihood that forward and backward interpolations generate matching frame data sufficient to keep upsampling processes engaged.

Figure 5:
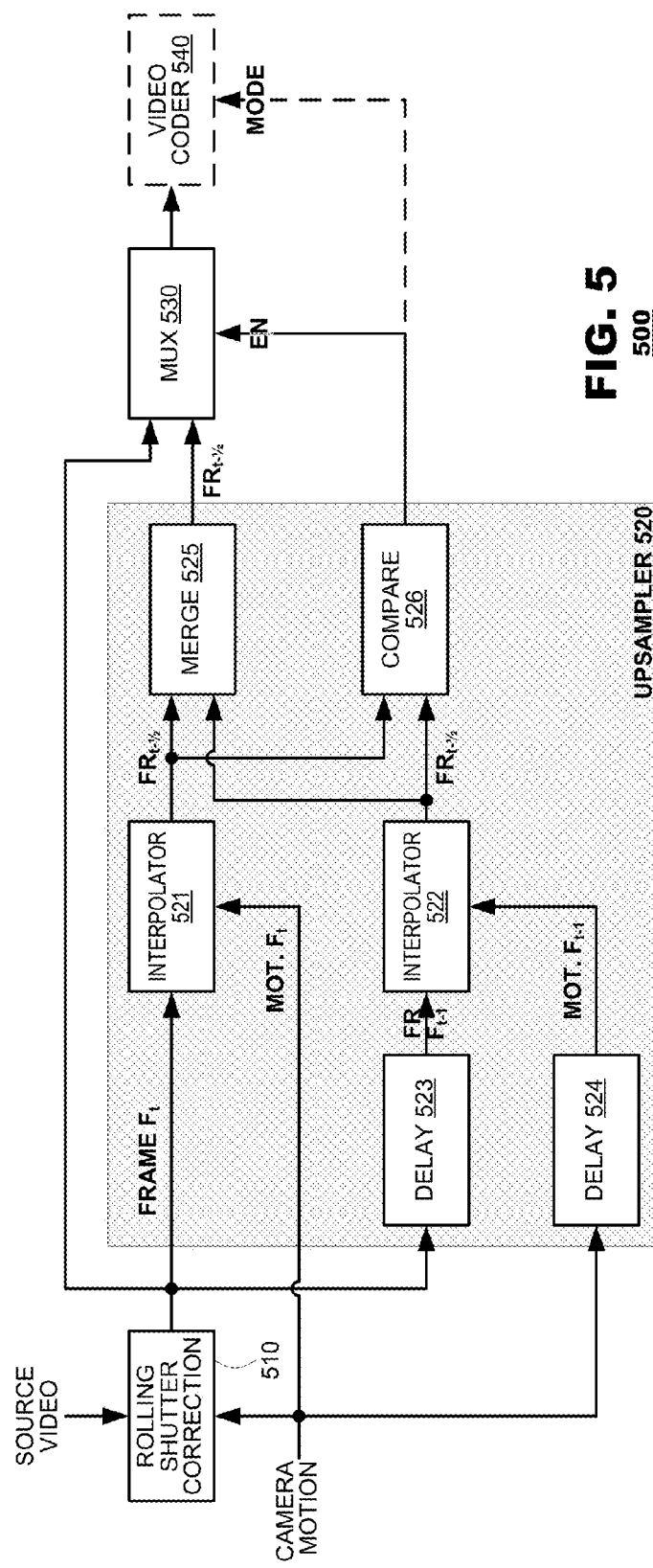
FIG. 5 is a simplified block diagram of an upsampling system according to an embodiment of the present invention.

FIG. 5 is a simplified block diagram of a system 500 that may perform upsampling according to an embodiment of the present invention. The system 500 may include a rolling shutter corrector 510, an upsampler 520 and a multiplexer 530. In an embodiment, the system 500 may be integrated within a preprocessor 230 (FIG. 2) and other processing units provided therein.

The upsampler 520 may include a first interpolator 521 having an input for frame data $F_t$ of a first time t and motion data associated with the first frame $F_t$, a second interpolator 522 having an input for frame data $F_{t-1}$ of a second time t-1 and motion data associated with the second frame $F_{t-1}$, a frame delay unit 523 to store frame data input to the upsampler 520 and output the frame data to the second interpolator 522, a motion delay unit 524 to store motion data input to the upsampler 520 and output the motion data to the second interpolator 522, a merger unit 525 to blend estimated frame data from the first and second interpolators 521, 522, and a comparator 526 to compare estimated frame data from the first and second interpolators 521, 522.

During operation, the rolling shutter corrector 510 may receive input data from the camera and perform rolling shutter corrections thereto. Many image sensors within camera systems 210 (FIG. 2) reset, integrate and output image data from pixels on a row-by-row basis rather than globally for all pixels in the array. Frame data output by such image sensors may exhibit distortions due to camera motion and the row-by-row skew in operation of the image sensor. The rolling shutter corrector 510 may estimate intra-frame skew in image content and correct it based on motion data provided by the motion sensor.

Frame data $F_t$ input to the upsampler may be input to the first interpolator 521 and the frame delay unit 523. Motion data input to the upsampler 520 may be input to the first interpolator and the motion delay unit 524. The first interpolator 521 may generate frame data $F_{t-1/2}$ at a hypothetical time t-½ from its inputs. The first interpolator 521, therefore, may generate frame data $F_{t-1/2}$ working backward from frame $F_t$.

The second interpolator 522 may receive frame data and motion data from the delay units 523, 524. Thus, at a time when the first interpolator 521 operates on frame data $F_t$ at time t, the second interpolator 522 may operate on frame data $F_{t-1}$ captured at an earlier time t-1. The second interpolator 522 may generate frame data $F_{t-1/2}$ at time t-½ from its inputs. The second interpolator 522, therefore, may generate frame data $F_{t-1/2}$ working forward from frame $F_{t-1}$.

The merger unit 525 may merge the content of the pair of frames estimated by the first and second interpolators 521, 522. The merger unit 525 may output a final frame $F_{t-1/2}$ for time t-½ to the multiplexer 530.

The comparator 526 may compare content of the pair of frames estimated by the first and second interpolators 521, 522. Based on the comparison, the comparator 526 may generate a control signal to the multiplexer 530. When the comparison indicates the frames estimated by the first and second interpolators 521, 522 match each other within a predetermined degree of accuracy, the comparator 526 may enable the multiplexer 530. If the frames estimated by the first and second interpolators 521, 522 do not match each other, however, the comparator 526 may disable the multiplexer 530.

The multiplexer 530 may merge the frames output by the upsampler 520 with the source video data stream under control of the signals output by the upsampler. The comparator 526 may selectively enable or disable the multiplexer 530 from integrating interpolated frames from the merger unit 525 based on the results of its comparison. If the comparator 526 determines that the interpolated frames match each other sufficiently well, the multiplexer 530 may merge the source video sequence with the sequence of interpolated frames output by the merger unit 525. If not, the multiplexer 530 simply may output the video sequence output by the rolling shutter corrector 510, effectively disregarding the interpolated output from the upsampler 520.

In an embodiment, the comparator 526 output also may be utilized by a video coder 540 to influence coding operations applied to the upsampled video sequence. For example, when a comparator 526 engages upsampling, the video coder 540 may be controlled to apply SKIP mode processing for frame content to the extent possible. SKIP mode coded pixel blocks typically inherit motion vectors and coded content of previously-coded pixel blocks and, therefore, provide a highly efficient manner for coding interpolated data.

Although the foregoing techniques have been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. Those skilled in the art will appreciate that these techniques may be implemented in other ways without departing from the sprit and substantive features of the invention. The present embodiments are therefore to be considered in all respects as illustrative and not restrictive.

We claim:

1. A video recording device, comprising:
a camera to capture image information and generate corresponding video data comprising a plurality of frames;
a motion sensor to detect the orientation of the camera in free space and generate corresponding orientation data;
a controller to interpret the orientation data and generate camera motion estimation data; and
a video preprocessor to estimate non-camera motion in the video data from an analysis of the camera motion estimation data and the video data content and to engage upsampling of the video data when the non-camera motion is below a predetermined threshold.

2. The device of claim 1, wherein the preprocessor determines non-camera motion by comparing estimated image content of a frame and actual image content of the frame at a given time.

3. The device of claim 1, wherein the preprocessor enables upsampling of the video data if the non-camera motion is below the threshold and disables upsampling if the non-camera motion is above the threshold.

4. The device of claim 1, wherein the preprocessor determines whether the non-camera motion for a set of frames of a predetermined period of time is lower than the threshold for the entirety of the predetermined period before enabling upsampling.

5. The device in claim 1, further comprising an upsampling device comprising:

a first interpolator to generate a first estimate of image content, based on a first input, of a new frame associated with the video data,
a second interpolator to generate the second estimate of image content of the new frame based on a second input,
a comparator to compare the first and second estimates of the image content to determine whether the estimates match each other within the predetermined degree of accuracy; and
a merger to merge the estimates to yield final estimated image content of the new frame if the estimates match each other within the predetermined degree of accuracy,
wherein the comparator disables the upsampling if the estimates do not match each other within the predetermined degree of accuracy.

6. The device of claim 5, wherein the first input is frame data associated with a first time, the second input is frame data associated with a second later time, and the final estimated image content of the new frame is associated with a third time that is between the first and second times.

7. The device of claim 5, wherein the comparator enables a multiplexer to merge the final estimated image content of the new frame with the original video data to yield an output video sequence having an upsampled frame rate.

8. The device of claim 7, further comprising a video coder that applies data compression operations on the output video sequence and a transmitter to transmit coded video data from the device.

9. The device of claim 1, further comprising an upsampling device comprising:
a first interpolator to generate a first estimate of image content, based on a first input, of each new frame in a plurality of new frames associated with the video data,
a second interpolator to generate a second estimate of image content of each new frame based on a second input,
a comparator to compare the first and second estimates of the image content for each new frame to determine whether the estimates match each other within a predetermined degree of accuracy; and
a merger to merge the estimates for each new frame to yield final estimated image content of the new frames if the estimates match each other within a predetermined degree of accuracy,
wherein, the comparator disables the upsampling if the estimates do not match each other within the predetermined degree of accuracy.

10. The device of claim 9, wherein the comparator enables a multiplexer to merge the final estimated image content of the new frames with the original video data to yield an output video sequence having an upsampled frame rate.

11. The device of claim 10, further comprising a video coder that applies data compression operations on the output video and a transmitter to transmit coded video data from the device.

12. The device of claim 9, wherein the upsampling device is configured to determine whether the estimates for each new frame in a set of new frames of a predetermined period of time match each other within the predetermined degree of accuracy for the entirety of the predetermined period before enabling upsampling.

13. A method, comprising:
capturing image information using a camera and generating corresponding video data comprising a plurality of frames;
detecting the orientation of the camera in free space using a sensor and generating corresponding orientation data;
interpreting the orientation data and generating camera motion estimation data;
estimating non-camera motion in the video data from the camera motion estimation data and the video data; and
engaging upsampling of the video data when the non-camera motion is below a predetermined threshold.

14. The method of claim 13, wherein the non-camera motion is determined by comparing estimated image content of a frame and actual image content of the frame at a given time.

15. The method of claim 13, wherein upsampling of the video data is enabled if the non-camera motion is below the threshold and disabled if the non-camera motion is above the threshold.

16. The method of claim 13, further comprising determining whether the non-camera motion for a set of frames of a predetermined period of time is lower than the threshold for the entirety of the predetermined period before enabling upsampling.

17. An upsampling device comprising:
a first interpolator to generate a first estimate, based on a first input, of image content of a new frame associated with video data,
a second interpolator to generate a second estimate of image content of the new frame based on a second input,
a comparator to compare the first and second estimates of the image content to determine whether the estimates match each other within a predetermined degree of accuracy; and
a merger to merge the estimates to yield final estimated image content of the new frame if the estimates match each other within the predetermined degree of accuracy,
wherein, the comparator disables upsampling if the estimates do not match each other within the predetermined degree of accuracy.

18. The device of claim 17, wherein the first input is frame data associated with a first time, the second input is frame data associated with a second later time, and the final estimated image content of the new frame is associated with a third time that is between the first and second times.

19. The device of claim 17, wherein the comparator enables a multiplexer to merge the final estimated image content of the new frame with the original video data to yield an output video sequence having an upsampled frame rate.

20. The device of claim 19, further comprising a video coder that applies data compression operations on the output video sequence and a transmitter to transmit coded video data from the device.

21. An integrated circuit comprising:
a video preprocessor to receive video data comprising a plurality of frames; and
a controller to receive orientation data associated with the orientation of a camera in free space and generate corresponding motion estimation data; wherein
the video preprocessor is configured to:
estimate non-camera motion in the video data from an analysis of the camera motion estimation data and the video data content; and
engage upsampling of the video data when the non-camera motion is below a predetermined threshold.

22. The circuit of claim 21, wherein the preprocessor determines non-camera motion by comparing estimated image content of a frame and actual image content of the frame at a given time.

23. The circuit of claim 21, wherein the preprocessor enables upsampling of the video data if the non-camera motion is below the threshold and disables upsampling if the non-camera motion is above the threshold.

24. The circuit of claim 21, wherein the preprocessor determines whether the non-camera motion for a set of frames of a predetermined period of time is lower than the threshold for the entirety of the predetermined period before enabling upsampling.

* * * * *